US008763050B2

(12) United States Patent
White

(10) Patent No.: US 8,763,050 B2
(45) Date of Patent: Jun. 24, 2014

(54) SYSTEM AND APPARATUS FOR ENHANCING DELIVERY OF MEDIA SERVICES

(75) Inventor: Scott White, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 388 days.

(21) Appl. No.: 11/742,113

(22) Filed: Apr. 30, 2007

(65) Prior Publication Data
US 2008/0271091 A1 Oct. 30, 2008

(51) Int. Cl.
*H04N 7/20* (2006.01)

(52) U.S. Cl.
USPC ............ 725/63; 725/32; 725/40; 725/42; 725/48; 725/51; 725/73; 725/98; 725/105; 725/120; 725/121; 725/122; 725/136; 725/111

(58) Field of Classification Search
USPC .......... 725/100, 131–134, 36, 40, 42, 48, 50, 725/51, 59, 63–73, 98, 103, 105, 114, 118, 725/120, 121–123, 136, 138–142, 144, 725/151–153
See application file for complete search history.

(56) References Cited

U.S. PATENT DOCUMENTS

| 5,151,789 | A | * | 9/1992 | Young ........................... 725/133 |
| 6,177,931 | B1 | * | 1/2001 | Alexander et al. .............. 725/52 |
| 7,194,753 | B1 | * | 3/2007 | Fries et al. ...................... 725/38 |
| 7,409,140 | B2 | * | 8/2008 | Rodriguez et al. .............. 725/59 |
| 7,512,964 | B2 | * | 3/2009 | Rodriguez et al. ............. 725/142 |
| 2002/0099842 | A1 | * | 7/2002 | Jennings et al. ............... 709/231 |
| 2002/0166123 | A1 | * | 11/2002 | Schrader et al. ................ 725/58 |
| 2003/0106056 | A1 | * | 6/2003 | Naimpally ...................... 725/40 |
| 2003/0145338 | A1 | * | 7/2003 | Harrington .................... 725/136 |
| 2005/0138668 | A1 | * | 6/2005 | Gray et al. ...................... 725/60 |
| 2007/0143796 | A1 | * | 6/2007 | Malik .............................. 725/51 |

OTHER PUBLICATIONS

Scientific Atlanta, Inc., "PowerVu® Model D9834 Satellite Receiver", 3 pages article, http://www.scientificatlanta.com/customers/source/7004050.pdf, web site last visited Apr. 30, 2007.

* cited by examiner

*Primary Examiner* — Yassin Alata
(74) *Attorney, Agent, or Firm* — Guntin & Gust, PLC; Ralph Trementozzi

(57) ABSTRACT

A system and apparatus for enhancing delivery of media services is disclosed. A system that incorporates teachings of the present disclosure may include, for example, a set-top box that can have a controller element to present at a media device content information received over a broadband connection. The content information can be associated with at least one satellite service presented to the media device over satellite signals disassociated with the broadband connection. The content information can also be received responsive to a request for said content information. Additional embodiments are disclosed.

21 Claims, 3 Drawing Sheets

__US 8,763,050 B2__

SYSTEM AND APPARATUS FOR ENHANCING DELIVERY OF MEDIA SERVICES

FIELD OF THE DISCLOSURE

The present disclosure relates generally to media services and more specifically to a system and apparatus for enhancing delivery of media services.

BACKGROUND

Recent advances in digital media programming allow a set-top-box (STB) to provide HDTV programming, video on demand (VoD) services, digital video recording (DVR) services, and/or other features to consumers at home. Although a STB can enable a presentation of media services from various service providers through different means (e.g. cable, dial-up, telephone, satellite) there is virtually no true integration between the services offered. Consequently, the user is generally unaware of the features (e.g. movies, entertainment schedules) available in one service (e.g. satellite) when actively engaged in the use of another media service (e.g. DSL).

A need therefore arises for a system and apparatus for enhancing delivery of media services.

DETAILED DESCRIPTION

Embodiments in accordance with the present disclosure provide a system and apparatus for enhancing delivery of media services.

In a first embodiment of the present disclosure, a computer-readable storage medium in a Set-Top Box (STB) can have computer instructions to receive from one or more satellites, signals associated with at least one multimedia satellite service, transmit over an Ethernet connection disassociated with the signals transmitted by the one or more satellites, a request for content information associated with the at least one multimedia satellite service, receive the content information over the Ethernet connection from a service provider of the at least one multimedia satellite service, and present at a media device the content information responsive to the request.

In a second embodiment of the present disclosure, a set-top box (STB) can have a controller element to present at a media device content information received over a broadband connection, wherein the content information is associated with at least one satellite service presented to the media device over satellite signals disassociated with the broadband connection, and wherein the content information is received responsive to a request for the content information.

In a third embodiment of the present disclosure, a system can have a controller element to transmit to a satellite set-top box (STB), over a broadband connection content, information associated with a satellite multimedia service responsive to a request transmitted by the satellite STB over a first port operably coupled to the broadband connection, wherein the satellite STB receives the satellite multimedia service over a second port operably coupled to at least one satellite that transmits satellite signals disassociated with the broadband connection.

In a fourth embodiment of the present disclosure, a method can involve receiving from an Ethernet port of an STB coupled to a digital subscriber line (DSL) interface content information associated with a satellite multimedia service supplied to a satellite port of the STB that is coupled to a satellite dish. The content information can be received during a presentation of satellite content received from the satellite port. The method can further involve presenting the content information from at least one among a display of a remote controller and a television (TV) set, each coupled to the STB. The content information can represent at least one among a promotional offering, an advertisement, a video trailer, and an Electronic Programming Guide (EPG), each associated with the satellite multimedia service.

Figure 1:
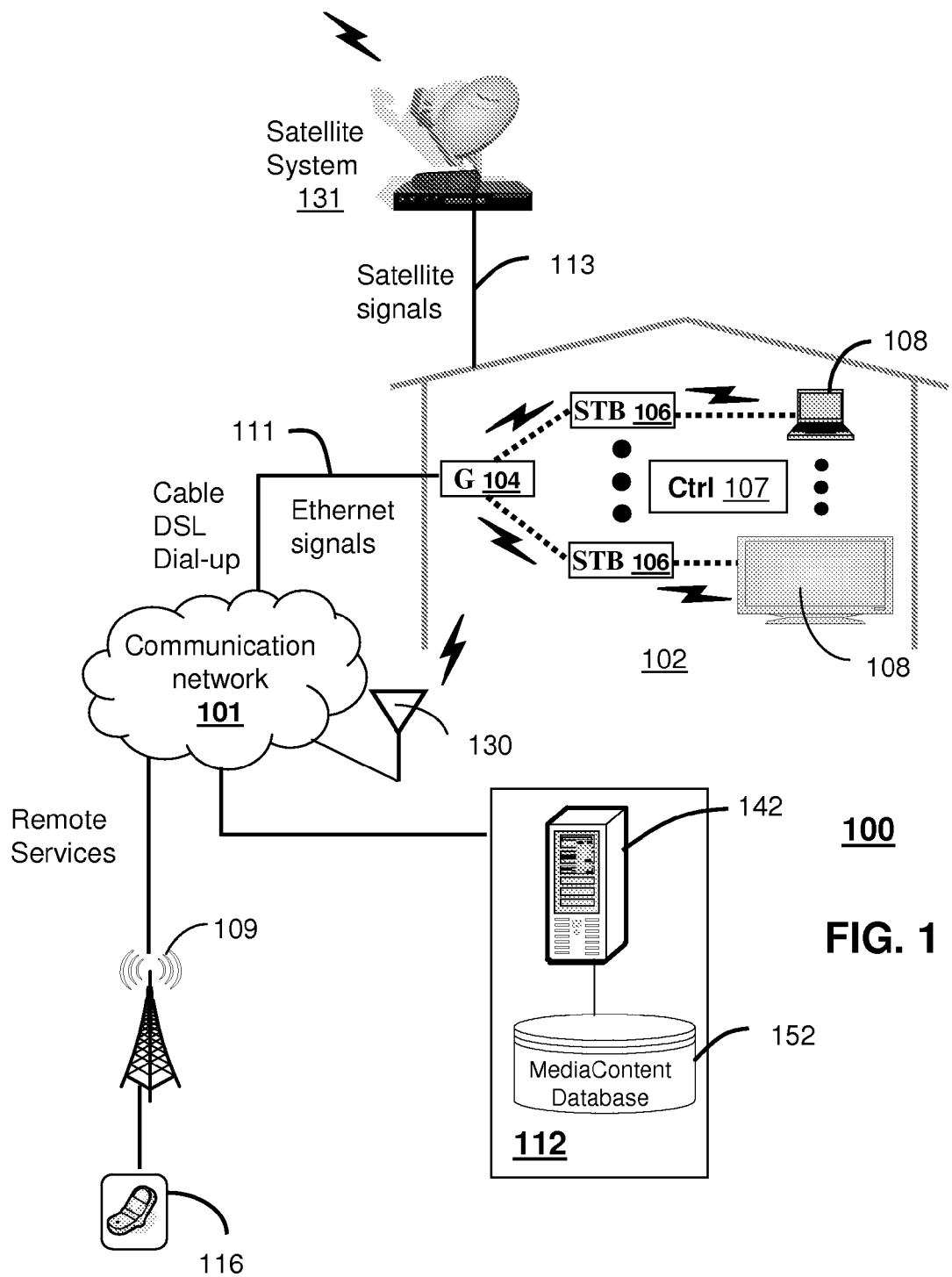
FIG. 1 depicts an exemplary embodiment of a communication system.

FIG. 1 depicts an exemplary embodiment of a communication system 100. The communication system 100 can comprise a satellite system 131 that delivers multimedia satellite services from one or more satellites to a residence or commercial establishment ("property") 102. The communication system 100 can include a media system 112, such as a back-end system, that delivers broadband media services to consumers via a communication network 101 to the property 102. The delivery of the broadband media services can be by way of a wireline connection with the property 102, such as an Ethernet connection (e.g., PSTN, cable, xDSL, dial-up) and/or a wireless connection (e.g., transponder 130) utilizing various wireless technologies. The communication network 101 can have common network elements that support wireline and/or wireless packet and/or circuit switched communication access technologies, and can include a telecommunication system 109 that provides wireless access (CDMA, GSM, Software Defined Radio, Ultra Wide Band, WiMax, etc.) to one or more mobile devices 116 (e.g. cell phone, portable music player, etc.) associated with the communication network 101.

The media system 112 can comprise a controller element 142 and a memory or mass storage system 152. The controller element 142 can utilize common computing technologies (e.g., desktop computer, server, etc.) to manage use of available processing resources of the media system 112 for executing one or more processes and to manage operation of the mass storage system 152. The mass storage system 151 can utilize common storage technologies (e.g., hard disk drives, flash memory, etc.) to store data in one or more databases. The media system 112 can represent an analog multimedia service system and/or digital multimedia service system such as presented by cable and telecommunication service providers. Multimedia services can include without limitation voice, moving images (e.g., MPEG4, high definition, standard or streaming video), still images (e.g., JPEGs), audio entertainment (e.g., MP3, or streaming audio), or any form of data services. Multimedia services provided by the media system 112 can also include presentation and delivery services for media content. A portion of digital multimedia services can also be presented by way of a common IPTV system which can deliver television and/or video signals distributed to the property 102.

The property 102 can include a common residential gateway (RG) 104 that exchanges unicast or multicast signals with the media system 112 over the communication network 101, and can distribute a portion of the Ethernet signals 111 and satellite signals 113 to one or more Set-Top Boxes (STBs) 106 used for presenting multimedia services to media devices 108 such as a computer, cell phone, portable music player, or analog or digital television (e.g., plasma TV). Alternatively, the STBs 106 can be coupled to the satellite system 131 and thereby receive the satellite signals 113 directly.

The STB 106 can be provided by a broadcast communications provider such as a cable, a satellite, or IPTV service provider to deliver a presentation of a media program at the media device 108. The STB 106 can include a first port to receive satellite signals 113 and a second port to receive Ethernet signals 111. The satellite signals 113 and Ethernet signals 111 can comprise at least one among digital and analog signals, with each transporting at least one among image, audio data, or combinations thereof. The media program can be a television show, a paid subscription channel, or any other form of media broadcast.

A media controller 107 can be programmed to control the STB 106 and/or the media device 108. The media controller 107 can utilize common infrared or RF signaling technology to communicate with any of the aforementioned subsystems of the communication system 100, including services offered by the satellite system 131 and the media system 112. The media controller 107 can also include a user interface (UI) for controlling the STB 106 and a display for visually presenting media information.

Figure 2:
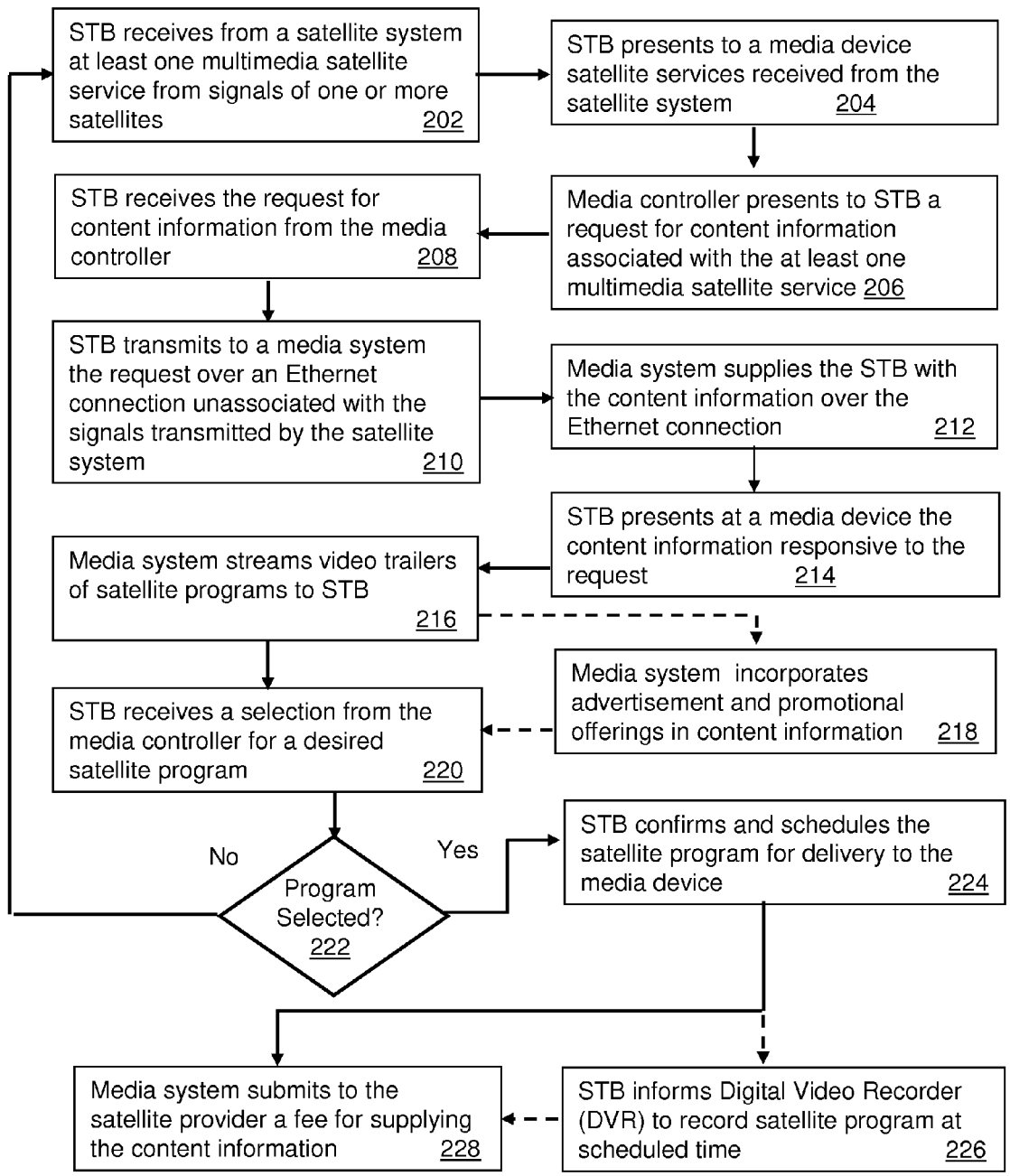
FIG. 2 depicts an exemplary method operating in portions of the communication system.

FIG. 2 depicts an exemplary method 200 operating in portions of the communication system 100. More specifically, the method 200 illustrates a means for enhancing delivery of media services. The method 200 can be practiced with more or less than the number of steps shown. Moreover, the method 200 is not limited to the order of steps shown. Reference will be made to FIG. 1 when describing the method 200, although it should be noted that the method 200 can be practiced in any other suitable system. Method 200 has variants as depicted by the dashed lines. It would be apparent to an artisan with ordinary skill in the art that other embodiments not depicted in FIG. 2 are possible without departing from the scope of the claims described below.

Method 200 begins with step 202 in which the STB 106 can receive at least one multimedia satellite service from the satellite system 131. The multimedia satellite service can correspond to on-demand satellite delivered programming (e.g. subscription, packages, services), general television programming (e.g. channel selection), pay-per-view satellite programming (e.g. movies, videos), broadcast channel programming (e.g. news, sports, entertainment), or any other suitable digital programming feature. A user in the property 102 using the media controller 107, or a user remote from the property 102 using the mobile device 116, can direct the STB 106 to select from the one or more satellite services offered by the STB 106. As an example, the user can view an electronic programming guide (EPG), view video on demand (VoD) catalogs, select one or more media programs for later viewing, adjust parental controls, modify media device settings, or manage other services supplied to or by the STB 106. In response to the STB 106 receiving a user selection from the media controller 107, the STB 106 at step 204 can present to the media device 108 the selected satellite services.

During a delivery of a satellite program, the user can request content information related to one or more other multimedia satellite services. The content information can contain high-quality video, cinematic sound, interactive menu selection, and/or other features, including those considered "rich-in" content (e.g. high quality audio and video). The user can direct the STB 106 to present the content information. In one embodiment, the user can request a display of the content information on the media device 108 (e.g. TV, computer), such as through use of the media controller 107. In another arrangement, the content information can be displayed on the media controller 107 and/or mobile device 116, thereby allowing the user to program the STB 106 and see the content information remotely.

At step 206, the media controller 107 can present to the STB 106 a request for content information associated with the at least one multimedia satellite service, such as upon receiving the user input request for content information. At step 208, the STB 106 can receive the request for content information from the media controller 107, and at step 210 the STB can transmit the request to the media system. In one embodiment, the request for content information is transmitted by the STB 106 over an Ethernet connection to the media system 112. The request for content information can be disassociated with the signals transmitted by the satellite system and received by the STB 106.

The media system 112 can store and retrieve content information related to one or more multimedia satellite services upon request. In one embodiment, the media system 112 can store vast quantities of data such as images, pictures, photos, music, and videos related to the one or more multimedia satellite services which can be programmed for delivery to the media system 112 by the service providers. For example, satellite service providers, or third party affiliates, can access the media system 112 over the Internet to frequently upload and update content information related to multimedia satellite services. In another embodiment, the media system 112 can retrieve content information stored elsewhere, including through queries and the like.

At step 212, the media system 112 can supply the STB 106 with the content information over the Ethernet connection. Recall, the Ethernet connection can be DSL (digital subscriber line), Internet Protocol Television (IPTV), cable, or dial-up service that is not associated with the communications service being supplied by the signals of the one or more satellites. In one embodiment, the Ethernet connection can be a high bandwidth connection that allows for fast data downloads and efficient delivery of the content information to the STB 106. In another embodiment, the Ethernet connection can accommodate higher data bandwidth traffic and deliver data at a lower latency than a satellite connection, thereby enhancing quality of service and user experience.

At step 214, the STB 106 presents at the media device 108 the content information responsive to the request. Recall, the STB 106 can receive the request during presentation of a television (TV) program, browsing of an EPG, browsing of a Pay-per-view (PPV) catalog, or reviewing of programs on a Digital Video Recorder (DVR). The STB 106 can provide the content information in a text, audio, and/or video format to the media device 108 (e.g. TV) and/or the media controller 107. For example, if the request is related to a satellite program, the information can textually identify a show time, a movie title, a movie rating, a review, or a short summary, as an example. Alternatively or in combination, the STB 106 may direct the media device 108 to audibly present the information to the user. As another example, if the request is related to a satellite service, the information can identify a service contact, a telephone number, a service time, or a description of the service, such as subscription charges, bundled programming features (e.g. buy one channel receive a $2^{nd}$ free), file sharing options (e.g. permissions, download speed), music download options (e.g. bandwidth, artist websites, industry ratings), or personal data applications, as examples.

In one embodiment, the content information can include a promotional offering, an advertisement, a video trailer, and/or an Electronic Programming Guide (EPG), with each associated with the satellite service. For example, as shown in step 216, the media system 112 can stream video trailers of satellite programs to the STB 106 for presentation on the media device 108 in response to a request for content information associated with the one or more satellite programs. Video trailers can be short video clips that present informative scenes of a video, movie, film, or program. Video trailers can allow users to receive content rich information in the same or similar format and quality as the corresponding video provided by satellite signals. The STB 106 can present the video trailers in the EPG, in a picture-in-picture (PIP), in a full screen view, or any other preferential display style available to the media device or media controller 107, or selected by the user, responsive to receiving the content information over the Ethernet connection.

In another embodiment, the media system 112 can also include advertisements and promotional offerings related to one or more satellite services in the content information, as shown in step 218. The advertisements and promotional offerings can be incorporated in an EPG, a movie catalog, a pay-per-view programming screen, or as a banner, separate video clip, or message. For example, the advertisement can identify a price for a service or program, bundled rates, and dates or times the show is offered at a discount price. In one embodiment, STB 106 can schedule a delivery of promotional information based on the content information requested. As another example, the STB 106 can present promotional information after a presentation of a requested video trailer that identifies other movies having similar themes or common actors with the movie corresponding to the video trailer. In another embodiment, the STB 106 can send promotional material associated with a multimedia satellite service as a text message or video clip to the mobile device 116, responsive to a remote request for the content information.

Upon reviewing the content information received over the Ethernet connection and displayed on the media device 108, the user can direct the STB 106 to accept a multimedia satellite service associated with the content information. At step 220, the STB 106 can receive the selection from the media controller 107 for a desired satellite service responsive to the user selection. If a program is not selected at step 222, the STB 106 can resume presentation of the current media and continue to receive multimedia satellite services back at step 202. If on the other hand a selection is made, then the STB 106 can confirm and schedule the satellite service, such as a program, for delivery to the media device, as shown in step 224. As an example, the STB 106 can visually present a confirmation for the satellite service identifying the selection and the price, if applicable. In another embodiment, the STB 106 can send a text message to the mobile device 116 confirming a delivery time of the service. In yet another embodiment, responsive to a user selection of a satellite program, the STB 106 can inform a Digital Video Recorder (DVR) to record the satellite program at a scheduled time, as shown in step 226.

After confirming a purchase or delivery of the satellite services, the media system 112 at step 228 can calculate a fee for supplying the content information to the satellite STB 106. The fee can be submitted to a multimedia satellite system supplying multimedia satellite services to the STB 106. In one arrangement, the media system 112 may charge a fixed fee based on the amount, or type, of content information provided, or the bandwidth used in delivering the content information. Alternatively, the media system may elect to charge a fee only if the user selects a program associated with content information the user recently requested. The service provider can then apply a service charge to the user's billing statement and/or bill the user at an address of the property 102.

Upon reviewing the embodiments disclosed, it would be evident to an artisan with ordinary skill in the art that said embodiments can be modified, reduced, or enhanced without departing from the scope and spirit of the claims described below. For example, the capabilities described for the media controller 107 in receiving the media content can be integrated in whole or part by the mobile device 116. In such regard, a user can receive media content and program content selections remotely using the mobile device 116. Method 200 can be modified so that instead of the STB 106 processing the request for content information, the media system 112 transmits the request to a $3^{rd}$ party provider hosting services for the satellite system 131 which responds with up-to-date media content. The content information can also be delivered to the STB 106 by other techniques, including wireless (e.g., wireless broadband) and/or a combination of a wired and wireless connection to the STB.

As another example, the service provider of the content information can charge a service fee for supplying the content information over the Ethernet port according to a Quality of Service (QoS) objective. The QoS objective can represent common video and audio QoS objectives. While the content information is being presented, the STB 106 can be programmed to buffer satellite media programming in a Digital Video Recorder (DVR) operably coupled to the STB 106 as an integral or external device. This function allows for a satellite program to be paused while presenting content information at the media device 108 and played back from the point of departure.

Other suitable modifications can be made to the present disclosure. Accordingly, the reader is directed to the claims below for a fuller understanding of the breadth and scope of the present disclosure.

Figure 3:
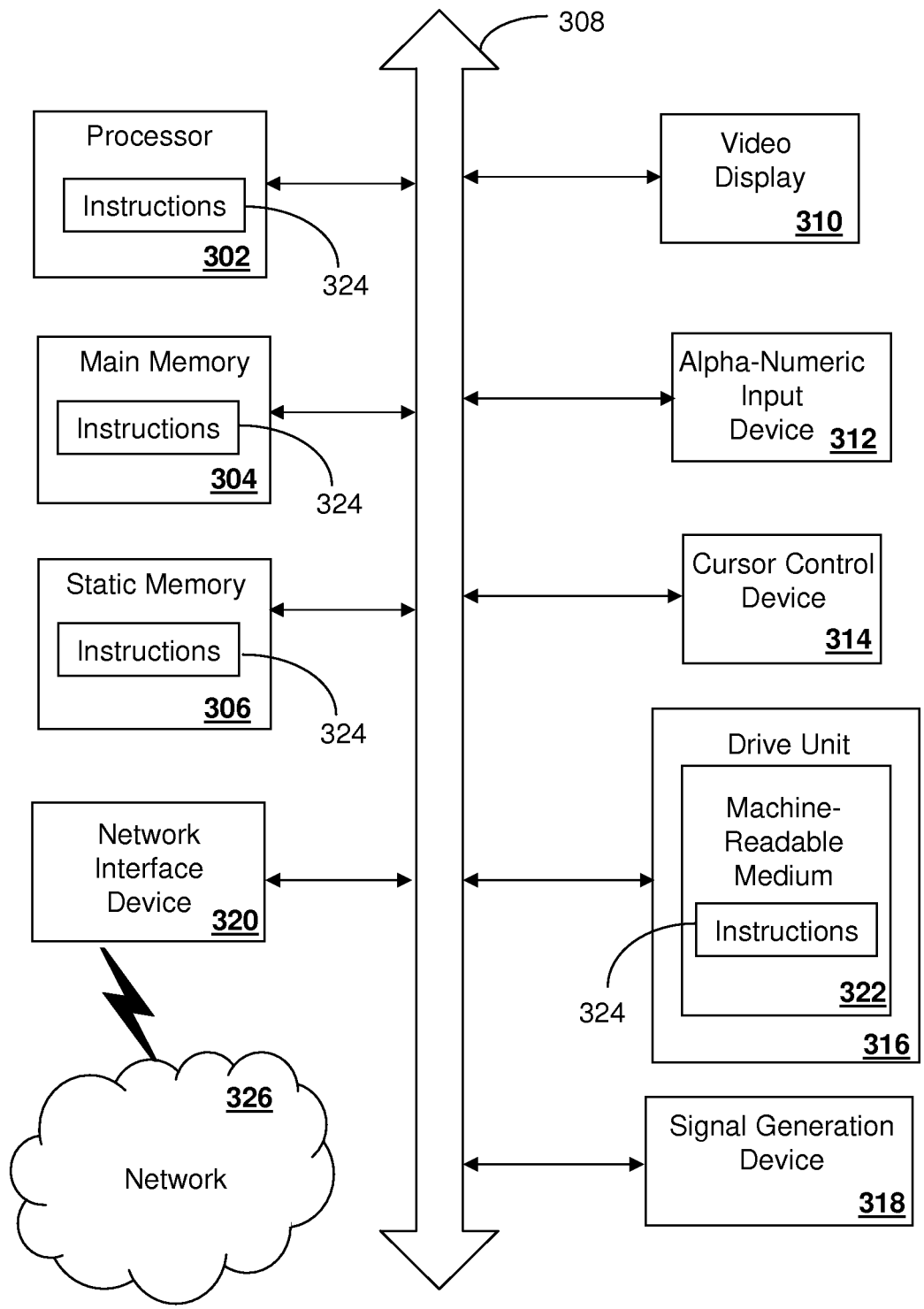
FIG. 3 depicts an exemplary diagrammatic representation of a machine in the form of a computer system within which a set of instructions, when executed, may cause the machine to perform any one or more of the methodologies disclosed herein.

FIG. 3 depicts an exemplary diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a mass storage medium 316, a signal generation device 318 (e.g., a speaker or remote control) and a network interface device 320.

The mass storage medium 316 may include a computer-readable storage medium 322 on which is stored one or more sets of instructions (e.g., software 324) embodying any one or more of the methodologies or functions described herein, including those methods illustrated above. The computer-readable storage medium 322 can be an electromechanical medium such as a common disk drive, or a mass storage medium with no moving parts such as Flash or like non-volatile memories. The instructions 324 may also reside, completely or at least partially, within the main memory 304, the static memory 306, and/or within the processor 302 during execution thereof by the computer system 300. The main memory 304 and the processor 302 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the computer-readable storage medium 322 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a is or tape; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory, machine-readable storage medium, comprising executable instructions, which when executed by a processor of a set-top box, cause the processor to facilitate performance of operations comprising:

receiving a satellite signal associated with a multimedia satellite service from a multimedia satellite service provider;

presenting, at a media device, a first satellite program of a plurality of satellite programs available by way of the satellite services that are received from the satellite signal;

receiving, during the presenting of the first satellite program, a first request from a cell phone for content information associated with media content provided by the multimedia satellite service and comprising information related to a second satellite program of the plurality of satellite programs;

transmitting, responsive to the first request, to a media system that is separate from the multimedia satellite service over an Ethernet connection disassociated with the satellites signal, a second request for the content information uploaded to the media system by satellite service providers to cause the media system to submit a fee to the multimedia satellite provider related to the content information;

receiving, without interrupting the presenting of the first satellite program, the content information comprising video related to the plurality of satellite program, incorporated in an electronic programming guide and sent over the Ethernet connection, wherein the Ethernet connection is within equipment of a service provider other than the multimedia satellite service provider;

providing to the cell phone the content information for presentation by the cell phone responsive to the second request, wherein presentation of the content information by the cell phone is concurrent with the presenting, at the media device, of the first satellite program;

receiving, during the presenting of the first satellite program, a selection of a second satellite program of the plurality of satellite program from the cell phone selected from the content information received over the Ethernet connection for requesting the second satellite program; and buffering the first satellite program of the plurality of satellite programs received from the multimedia satellite service provider in a digital video recorder operably coupled to the set-top box while presenting the content information.

2. The non-transitory, machine-readable storage medium of claim 1, wherein the content information comprises text data.

3. The non-transitory, machine-readable storage medium of claim 1, wherein the content information comprises a video trailer for a satellite program of the plurality of satellite programs.

4. The non-transitory, machine-readable storage medium of claim 1, wherein the content information comprises a portion of an advertisement for a satellite program of the plurality of satellite programs.

5. The non-transitory, machine-readable storage medium of claim 1, wherein the Ethernet connection is selected from a group consisting of a digital subscriber line, an internet protocol television service, a cable and a dial-up service independent of communications services supplied by the satellite.

6. The non-transitory, machine-readable storage medium of claim 1, wherein the multimedia satellite service corresponds to a service selected from a group consisting of on-demand satellite delivered programming, pay-per-view satellite programming, general television programming and broadcast channel programming.

7. The non-transitory, machine-readable storage medium of claim 1, wherein the operations further comprise presenting the content information at a display of the cell phone.

8. A set-top box, comprising:
a controller element; and
a memory that stores machine-readable instructions, coupled to the controller element, wherein the machine-readable instructions, when executed by the controller element, cause the controller element to facilitate performance of operations comprising:

presenting, at a media device, a first satellite program of a plurality of satellite programs provided by equipment of a satellite service provider;

receiving, during the presenting of the first satellite program, a first request from a cell phone for content information associated with the plurality of satellite programs and comprising information related to a second satellite program of the plurality of satellite programs;

transmitting, responsive to the first request, to a media system that is separate from equipment of the satellite service provider over a broadband Ethernet connection, a second request for the content information uploaded to the media system by satellite service providers, the second request causing the media system to submit a fee to the satellite service provider related to the content information;

receiving, without interrupting the presenting of the first satellite program, the content information comprising information related to each satellite program of the plurality of satellite programs, over the broadband Ethernet connection;

presenting the content information at the cell phone concurrently with the presenting of the first satellite program, wherein the content information comprises the information related to each satellite program of the plurality of satellite programs and is associated with the first satellite program presented to the media device, wherein the first satellite program is communicated via satellite signals independent of the broadband Ethernet connection;

informing a digital video recorder operably coupled to the set-top box to record a second satellite program of the plurality of satellite programs provided by the equipment of the satellite service provider at a scheduled time in response to receiving a selection from the cell phone for the second satellite program, and wherein the selection is based on the content information; and buffering the first satellite program of the plurality of satellite programs in the digital video recorder while presenting the content information and wherein the content information is incorporated in an electronic programming guide.

9. The set-top box of claim 8, wherein the content information comprises video trailers for a group of satellite programs of the plurality of satellite programs that are associated with the equipment of the satellite service provider and wherein the video trailers are incorporated in an electronic programming guide.

10. The set-top box of claim 8, wherein the first request is received during presentation of one of a television program, browsing of an electronic programming guide, browsing of a pay-per-view catalog, and reviewing of programs on the digital video recorder.

11. The set-top box of claim 8, wherein the operations further comprise programming the digital video recorder to record a satellite program responsive to scheduling information of a second satellite program of the plurality of satellite programs received over the broadband connection.

12. The set-top box of claim 8, wherein the set-top box is managed in part by the cell phone that submits the first request and directs the set-top box to present selected satellite programs of the plurality of satellite programs at the cell phone.

13. The set-top box of claim 8, wherein the operations further comprise presenting to the cell phone a confirmation that a second satellite program of the plurality of satellite programs has been selected over the broadband Ethernet connection.

14. The set-top box of claim 13, wherein the cell phone displays one of a title and a start time of each satellite program of the plurality of satellite programs.

15. The set-top box of claim 8, wherein equipment of a broadband service provider stores a plurality of video trailers and sends a video trailer of the plurality of video trailers to the set-top box in response to receiving the request for content information.

16. A system, comprising:
a controller element; and
a memory that stores machine-readable instructions, coupled to the controller element, wherein the machine-readable instructions, when executed by the controller element, cause the controller element to facilitate performance of operations comprising:
receiving from a satellite set-top box over a broadband Ethernet connection a first request for content information responsive to a second request from a cell phone for content information associated with media content provided by a multimedia satellite service, wherein the content information comprises information related to a second satellite program of a plurality of satellite programs, wherein the receiving of the first request occurs while the set-top box is presenting to a media device a first satellite program of the plurality of satellite programs received from equipment of a first service provider;
transmitting to the satellite set-top box, over the broadband Ethernet connection, the content information from equipment of first service provider associated with a satellite multimedia service for presentation on the cell phone without interrupting the presenting of the first satellite program, wherein the transmitting of the content information is responsive to the second request, and wherein the satellite set-top box receives the second satellite program of the plurality of satellite programs from the satellite multimedia service in response to a selection of the second satellite program for presentation on the media device based on the content information over a second port operably coupled to a satellite that transmits satellite signals from equipment of a second service provider disassociated with the broadband Ethernet connection and disassociated with the equipment of the first service provider;
submitting a fee to the first service provider associated with the satellite multimedia service, wherein the fee is related to the content information and the submitting of the fee is in response to the transmitting of the content information; and
buffering the first satellite program of the plurality of satellite programs in a digital video recorder operably coupled to the satellite set-top box while presenting the content information and wherein the content information is incorporated in an electronic programming guide.

17. The system of claim 16, wherein the operations further comprise:
determining a fee for supplying the content information comprising video trailers of a group of satellite programs of the plurality of satellite programs to the satellite set-top box over the broadband Ethernet connection; and
submitting the fee to a multimedia satellite system supplying multimedia satellite services to the satellite set-top box over the broadband Ethernet connection.

18. The system of claim 16, wherein the content information comprises video trailers of a group of satellite programs of the plurality of satellite programs that are associated with the satellite service and wherein the video trailers of the satellite programs are incorporated in an electronic programming guide.

19. A method, comprising:
receiving, by a system comprising a processor, a first request from a cell phone for content information comprising information related to a first satellite program of a plurality of satellite programs;
transmitting, by the system, through an Ethernet port of a set-top box coupled to a digital subscriber line interface, a second request for the content information, responsive to the first request, the second request resulting in a submission of a fee to a satellite service provider related to the content information;
receiving, by the system, from the Ethernet port of the set-top box, the content information associated with a satellite multimedia service of the satellite service provider supplied to a satellite port of the set-top box that is coupled to a satellite dish, wherein the content information is received during a presentation of a second satellite program of the plurality of satellite programs received from the satellite port and the second satellite program received at the satellite port is disassociated with the content information associated with the satellite multimedia service received at the Ethernet port and disassociated with a service provider for digital subscriber line service over the Ethernet port and wherein the Ethernet port accommodates higher data bandwidth traffic and delivers data at a lower latency than the satellite port;
presenting, by the system, the content information to a cell phone communicatively coupled to the set-top box during a presentation of the first satellite program received from the satellite port, wherein the content information is selected from a group consisting of a promotional offering, an advertisement and a video trailer, each associated with the satellite multimedia service;
recording, by the system, a second satellite program of the plurality of satellite programs selected from the content information received at the Ethernet port and presented at a display in response to a selection received from the cell phone; and
buffering, by the system, the first satellite program of the plurality of satellite programs received from the satellite port in a digital video recorder operably coupled to the set-top box while presenting the content information and wherein the content information is incorporated in an electronic programming guide.

20. The method of claim 19, comprising charging, by the system, a service fee for supplying the content information over the Ethernet port in accordance with a quality of service objective.

21. The method of claim 20, wherein the quality of service objective identifies a video and audio resolution objective for presenting the content information.

* * * * *